Oct. 21, 1958

J. J. CHYLE 2,856,682

METHOD OF MAKING SILVER LINED STEEL STRUCTURE

Filed Oct. 16, 1953

INVENTOR.
John J. Chyle
BY Andrus & Sceales
ATTORNEYS.

United States Patent Office 2,856,682
Patented Oct. 21, 1958

2,856,682

METHOD OF MAKING SILVER LINED STEEL STRUCTURE

John J. Chyle, Wauwatosa, Wis., assignor to A. O. Smith Corporation, Milwaukee, Wis., a corporation of New York Application October 16, 1953, Serial No. 386,589

4 Claims. (Cl. 29—492)

This invention relates to a silver-lined carbon steel composite structure and to a method of making the same.

Another object of the invention is to provide a method of bonding silver to carbon steel by employing an intermediate layer of straight chromium stainless steel or a layer of low-nickel stainless steel.

Another object is to provide a method of applying a silver lining to a carbon steel base by using a stainless steel intermediate layer which results in the elimination of intergranular penetration of the intermediate layer by the silver.

A further object is to provide a method of deposit welding a silver lining to a carbon steel base.

In the past, considerable difficulty has been encountered in the bonding or welding of silver to carbon steel, and the attachment of the two metals could generally be achieved only by the application of high temperatures and pressures. To eliminate the necessity for the high temperatures and pressures, it has been proposed to apply an intermediate layer of Monel metal or Inconel to the carbon steel and thereafter weld the silver layer to the Monel. However, during welding the high temperatures involved cause the silver to penetrate the grain structure of the Monel layer, thereby resulting in intergranular cracking which in many cases is so severe that leakage occurs between layers.

This invention is based on the discovery that silver may be effectively bonded to carbon steel by the use of an intermediate layer of austenitic stainless steel, having a low nickel content, or a straight chromium stainless steel. By using this type of an intermediate layer there is no penetration of the layer by the silver with a result that the composite structure is sound and has an excellent appearance.

Other advantages of the invention will appear in connection with the accompanying drawing in which.

Figure 1:
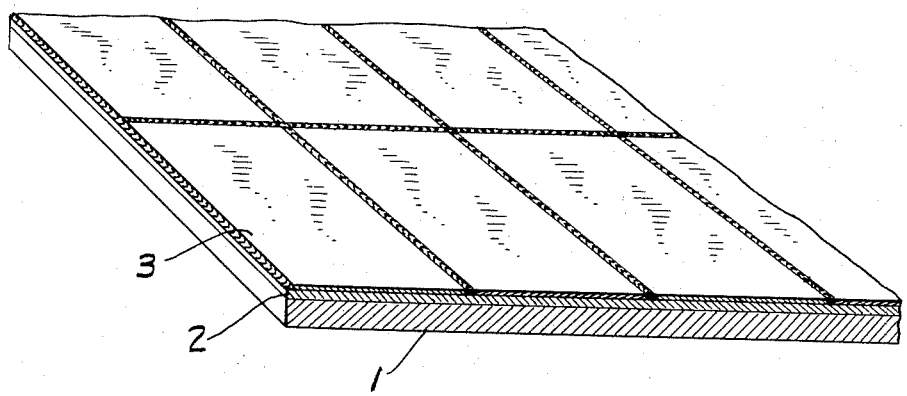
Figure 1 is a perspective view showing a portion of a composite structure in which the silver lining is strip welded to the carbon steel base by use of an intermediate layer of stainless steel.
Figure 2:
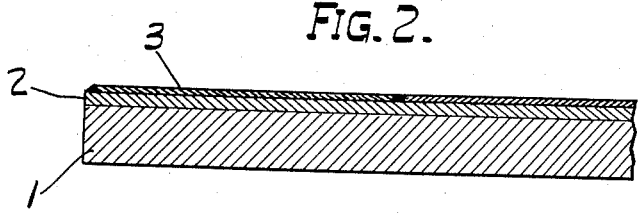
Fig. 2 is a sectional view of the structure shown in Figure 1.

Referring to Figures 1 and 2 there is shown a composite structure such as a vessel comprising a steel article 1 to be lined or otherwise coated with silver. The article 1 may be formed of any of the common types of carbon steel, such as A. S. T. M.—A.-285, which is suitable for the purposes to which the structure is to be employed.

An intermediate layer of stainless steel 2 is applied to the base 1 by cladding, welding or any other commercially used method of applying stainless steel to carbon steel. The layer of stainless steel 2 is either a straight chromium variety or an austenitic stainless steel having a nickel content of less than 25% by weight of the alloy.

If an austenitic stainless steel is employed, a nickel content in excess of this limit is apt to result in intergranular penetration of the layer 2 by the silver, and thus for most applications the nickel content should be in the range of about 7% to 20% by weight of the steel.

In the austenitic stainless steel the chromium content should be in the range of about 16% to 30%, by weight, and if a straight chromium stainless steel is used, the chromium content may vary between 11% and 30%. The following stainless steel compositions have been successfully employed as the intermediate layer 2:

| | Percentage by weight |
|---|---|
| Chromium | 17.0–19.0. |
| Nickel | 7.0–9.0. |
| Carbon | 0.08–0.20. |
| Silicon | 0.75 max. |
| Manganese | 0.60 max. |
| Iron | balance. |

| | Percentage by weight |
|---|---|
| Chromium | 22.0–26.0. |
| Nickel | 11.0–13.0. |
| Carbon | 0.20 max. |
| Silicon | 0.75 max. |
| Manganese | 1.00 max. |
| Iron | balance. |

As shown in Figures 1 and 2 the silver lining 3 is applied in the form of sheets of any suitable length and width to the stainless steel layer 2 by any suitable welding process. The silver layer 3 may be substantially pure and may be welded to the layer 2 by the atomic hydrogen process or the inert gas process using argon or helium. The thickness of the silver layer 3 depends on the desired use of the composite structure. For most commercial purposes a silver layer of approximately 3/32 to 1/8 of an inch is satisfactory.

As shown in the drawings, the sheets of silver 3 are welded to the stainless steel layer 2 along the periphery of the sheets. If this attachment is not sufficient for a particular application, the sheets can be additionally secured to the layer at intervals throughout their surface by fusion welding or electric resistance welding.

Figure 3:
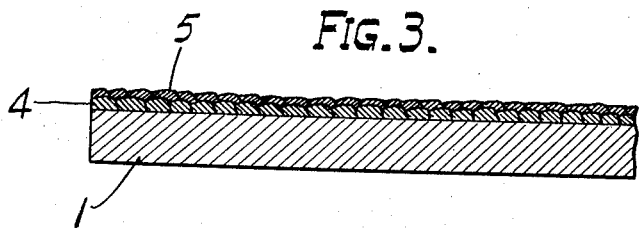
Fig. 3 is a sectional view of a modified form of a composite structure in which the layers are applied to the carbon steel by deposit welding.

Fig. 3 shows the application of the invention to the facing of manways and the like where sheet lining cannot be applied and in which the stainless steel 4 is deposited by a suitable form of fusion welding onto the carbon steel base 1. The silver layer is applied to the stainless steel deposit 4 as a weld deposit 5.

With the use of this invention it is possible to obtain an effective bond between a silver lining and a carbon steel base. No intergranular penetration of this stainless steel layer will occur so that the resulting bond is free of intergranular cracking and the composite structure will retain its sound properties under high pressures.

Various modes of carrying out the invention are contemplated as within the scope of the following claims particularly pointing out and distinctly claiming the subject matter which is regarded as the invention.

I claim:

1. A method of bonding silver to carbon steel, comprising welding a layer of stainless steel to a surface of said carbon steel, said stainless steel having a nickel content of less than 25% by weight of said stainless steel, and thereafter arc welding a layer of silver to said stainless steel to provide a structure free of intergranular cracking.

2. A method of fabricating a composite metal structure, comprising cladding a layer of straight chromium stainless steel on a carbon steel base, and thereafter arc welding a layer of silver to said stainless steel to produce a structure having a tightly adherent bond between the silver and the carbon steel.

3. A method of fabricating a composite metal structure, comprising applying an intermediate layer of stainless steel to a carbon steel base, said stainless steel having a nickel content from about 7% to 20% and a chromium content from about 16% to 30%, and thereafter depositing a layer of silver on the stainless steel by welding to provide an adherent bond between the silver and carbon steel without producing intergranular penetration of the intermediate layer by the silver.

4. A method of bonding silver to carbon steel, which comprises securing a layer of stainless steel to a surface of said carbon steel, said stainless steel being selected from the group consisting of (1) an austenitic steel alloy having a nickel content of less than 25% by weight of said alloy, (2) an austenitic steel alloy having a chromium content of about 16% to 30% by weight thereof, and (3) a straight chromium steel alloy having a chromium content of from 11% to 30%, and thereafter fusion welding a layer of silver to said stainless steel to provide a structure free of intergranular cracking.

References Cited in the file of this patent

UNITED STATES PATENTS

| | | |
|---|---|---|
| 2,034,278 | Becket et al. | Mar. 17, 1936 |
| 2,106,809 | Prange et al. | Feb. 1, 1938 |
| 2,392,917 | Guinee | Jan. 15, 1946 |
| 2,474,038 | Davignon | June 21, 1948 |
| 2,537,207 | Carlson et al. | Jan. 9, 1951 |
| 2,621,988 | Donley | Dec. 16, 1952 |
| 2,698,813 | Pun Kien Koh | Jan. 4, 1955 |